United States Patent [19]

Elsner

[11] Patent Number: 4,471,668
[45] Date of Patent: Sep. 18, 1984

[54] DRIVE ASSEMBLY WITH A PRIME MOVER AND A FLYWHEEL

[75] Inventor: Ernst Elsner, Herbrechtingen, Fed. Rep. of Germany

[73] Assignee: Voith Getriebe KG, Fed. Rep. of Germany

[21] Appl. No.: 354,100

[22] PCT Filed: May 29, 1981

[86] PCT No.: PCT/EP81/00059
  § 371 Date: Feb. 23, 1982
  § 102(e) Date: Feb. 23, 1982

[87] PCT Pub. No.: WO82/00270
  PCT Pub. Date: Feb. 4, 1982

[30] Foreign Application Priority Data

Jul. 10, 1980 [DE] Fed. Rep. of Germany ....... 3026219

[51] Int. Cl.³ .................. F16H 47/04; G05G 3/00; F01K 23/00
[52] U.S. Cl. .................................. 74/687; 74/572; 60/718; 180/165
[58] Field of Search ................ 74/687, 664, 688, 751, 74/730, 572; 60/716, 718; 180/165

[56] References Cited

U.S. PATENT DOCUMENTS

| | | | |
|---|---|---|---|
| 2,803,151 | 8/1957 | Clerk | 74/751 |
| 3,485,037 | 12/1969 | Clerk | 74/572 X |
| 3,641,843 | 2/1972 | Lemmens | 180/165 X |
| 3,665,788 | 5/1972 | Nyman | 74/687 X |
| 3,749,194 | 7/1973 | Bardwick | 180/165 X |
| 3,870,116 | 3/1975 | Seliber | 180/165 |
| 4,110,982 | 9/1978 | Regar | 74/572 X |
| 4,126,200 | 11/1978 | Miller et al. | 180/66 R |
| 4,184,385 | 1/1980 | Maeda | 74/687 |
| 4,232,568 | 11/1980 | Maeda | 74/687 |
| 4,306,467 | 12/1981 | Pollman | 74/687 |

FOREIGN PATENT DOCUMENTS

| | | |
|---|---|---|
| 2444564 | 4/1976 | Fed. Rep. of Germany . |
| 2710532 | 9/1977 | Fed. Rep. of Germany . |
| 2365066 | 4/1978 | France . |
| 2016098 | 9/1979 | United Kingdom . |

OTHER PUBLICATIONS

Dr.-Ing. Helmar Strauch, "Axialkolben-Umlaufgetriebe", Olhydraulik und Pneumatik 15, (1971), No. 9, pp. 385-391.

Primary Examiner—Allan D. Herrmann
Assistant Examiner—Bruce F. Wojciechowski
Attorney, Agent, or Firm—Ostrolenk, Faber, Gerb & Soffen

[57] ABSTRACT

A drive assembly for a motor vehicle, especially for city buses, consists of a continuously variable transmission (G) and four clutches (31, 32, 33 and 34). The first clutch (31) connects a prime mover (M) to a flywheel (S), the second (32) the flywheel (S) to intermediate gearing (Z), the third (33) the prime mover (M) to a driven shaft (30), and the fourth (34) the intermediate gearing (Z) to the driven shaft (30). To keep the variable transmission (G) as simple as possible it has a differential (D) with three transmission components (21, 22, and 23) and is preferably in the form of a planetary-gear set. The variable transmission (G) is composed of two, preferably hydrostatic units ($G_1$ and $G_2$). The internal geared wheel (23) of the planetary-gear set (D) is preferably connected to the prime mover, its sun wheel (21) with one hydrostatic unit ($G_1$), and its ring gear (22) with both the intermediate gearing (Z) and the other hydrostatic unit ($G_2$).

8 Claims, 5 Drawing Figures

DRIVE ASSEMBLY WITH A PRIME MOVER AND A FLYWHEEL

BACKGROUND OF THE INVENTION

1. Technical Field

The invention concerns a drive assembly that is intended especially for motor vehicles. The drive assembly has a prime mover or engine, a flywheel, and a continuously variable transmission with a first and second connection (11 and 12). The drive assembly also has a driven shaft, intermediate gearing, and four clutches, (a) the first clutch is between the prime mover and the flywheel,
(b) the second clutch is between the flywheel (S) and the intermediate gearing,
(c) the third clutch is between the prime mover and the driven shaft, and
(d) the fourth clutch is between the intermediate gearing and the drive shaft.

2. State of the Art

Such a drive assembly is known from German Offenlegungsschrift No. 2 710 532 (corresponding to U.S. Pat. No. 4,126,200). In FIG. 1 of that document the prime mover is designated 10, the flywheel 17, the continuously variable transmission 15 and the drive shaft 31. The intermediate gearing consists of gear wheels 35, 40, and 39. Variable transmission 15 is coupled to both prime mover 10 and intermediate gearing 35, 40, and 39. The four clutches referred to above are made up of the components 37 and 42, 42 and 39, 33 and 44, and 35 and 44. Possible gearing states include (1) an initial operating range (with clutches 37+42 and 35+44 engaged) in which the sum of the outputs from the prime mover and from the flywheel is transmitted through the continuously variable transmission and (2) a subsequent operating range (with clutches 39+42 and 33+44 engaged) in which only the output from the flywheel is transmitted through the continuously variable transmission, with that from the prime mover transferred directly, and hence with practically no loss, to the drive shaft.

Page 29, paragraph 2 of the Offenlegungsschrift says that, although different types of continuously variable transmissions can be employed in the device, the power-distributing hydrostatic transmission described on pages 385 to 391 of the journal *Olhydraulik und Pneumatik*, 1971 is to be preferred. The advantage of this type of transmission over other continuously variable mechanisms is that one component of the output can be transmitted purely mechanically to improve efficiency. The hydraulic component of the power of the transmission is, except immediately after starting, relatively low.

The rotating housing employed in power-distributing hydrostatic transmissions, however, makes them relatively expensive. Another problem is that they are often relatively long overall. Still another drawback is that the mechanical coupling of the two hydrostatic units over a common rotating housing makes it impossible to optimize either of them alone with respect to maximal speed or minimal specific volume.

The known drive assembly shifts from the initial operating range to the subsequent operating range when the speed ratio of the hydrostatic transmission exceeds 1. The range in which the hydraulic power component of the power-distributing hydrostatic transmission is relatively low can thus be increased even further. The speed ratios of the significant drive components can, according to page 33 of the Offenlegungsschrift, also be adjusted to the transmission ratio of the hydrostatic device at the changeover point by dimensioning gear wheels 33, 35, and 37 to 40 appropriately so that the mechanism will shift from the initial operating range to the subsequent range (or vice versa) without relative speeds at the clutches. One disadvantage however is that a relatively large number of wheel gears, usually three or four, is required. It is also impossible to regulate power distribution directly because its continuing operation depends as mentioned above on the transmission ratio at the changeover point. To exploit the hydrostatic transmission to fullest advantage this ratio must be more or less maximal. Any alteration in the curve of power distribution will usually result in an alteration in the maximal volumetric delivery of the hydrostatic transmission, which will simultaneously necessitate an alteration in the transmission ratio of the wheel drive.

THE PROBLEM AND ITS SOLUTION IN ACCORDANCE WITH THE INVENTION

The object of the invention is to improve the drive assembly described in the introduction in such a way that the simplest possible continuously variable transmission can be employed while permitting the power-distribution curve to be altered with minimum expense.

The invention concerns a drive assembly for motor vehicles, including a prime mover or engine, a flywheel connectable with the engine for being driven to rotate, a continuously variable transmission, possibly of the hydrostatic variety, and having two separate connections thereto, a driven shaft to be driven to rotate and intermediate gearing. Four clutches are provided. The first clutch is between the engine and the flywheel. The second clutch is between the flywheel and the intermediate gearing. The third clutch is between the engine and the driven shaft. The fourth clutch is between the intermediate gearing and the driven shaft. Significant here is the provision of a differential with at least three transmission components. The first of the transmission components is connected to the engine. The second of the transmission components is connected with the continuously variable transmission. The third transmission component is connected with the intermediate gearing.

In preferred embodiments, the differential is of the planetary gear variety including a sun wheel, an internal geared wheel around the sun wheel and a pinion cage connected between the sun wheel and the internal geared wheel. In various embodiments, the sun wheel is connected either to the engine or to a connection to the continuously variable transmission, while the internal geared wheel is connected to the other of the engine and the connection to the continuously variable transmission. As a further development of the invention, the second connection to the continuously variable transmission may be from the engine or it may be from the intermediate gearing.

As a further feature of the invention, there may be different gear ratios between the flywheel and the engine, on the one hand, and between the flywheel and the intermediate gearing, on the other hand. These gear ratios are selected so that the first connection to the continuously variable transmission will rotate in the same sense under all operating conditions.

The invention makes it possible to combine the advantages of (a) eliminating the necessity of power division in a continuously variable transmission, permitting, that is, the use of simple, continuously adjustable transmission elements that are readily available commercially, even for higher outputs, and that in the case of hydrostatic units can be added individually.

(b) making the total transmission very compact, since, except for the differential, only a few gear wheels are necessary, (c) selecting a power-distribution curve that has a relatively wide range with a low power component in the continuously variable transmission, and (d) shifting from the initial operating range to the subsequent operating range (or back) at uniform clutch speeds.

The continuously variable transmission can be broken down into two individual mechanisms operating at up to maximal permissible speed in almost any embodiment of the invention. Their size can thus be kept very small. The exact layout of the two units is to a large extent unimportant. In other words, the two units may be arranged in different ways. They can for example be mounted next to each other, resulting in a drive assembly that is not very long overall. Under certain conditions the units can be flange-mounted to the outside of the transmission housing, where they can easily be exchanged when maintenance is required.

When the power-distribution curve has to be altered it will only be necessary to alter the gear ratio of the differential. A special advantage of the invention is that, in so doing, the continuously variable transmission will not have to be altered.

As with the drive assembly known from Offenlegungsschrift No. 2 710 532, various known types can be employed for the continuously variable transmission. The additonal differential, however, will provide power distribution for any type of transmission and will increase efficiency.

A slight change in the transmission layout will lead to various types of characteristic curve. The embodiment described in connection with below described FIGS. 1 or 2 for example can be used to obtain a characteristic in the output component of the continuously variable transmission that will decrease hyperbolically in the initial-operation range and increase linearly in the subseqent range.

The embodiment described in connection with FIG. 3, on the other hand, makes the curve decrease linearly in the initial range and subsequently increase hyperbolically. This embodiment is generally preferred because the range of lower power output in the continuously variable transmission will be wider.

The connections of the embodiments of FIGS. 2 and 4 ensure that the transmission element that rotates most rapidly in the differential is the sun wheel, the one that can most readily stand the highest speed.

The feature relating to the gear ratios between the flywheel and both of the engine and the intermediate gearing is another important and advanced concept of the invention, which provides that neither of the two units of the continuously variable transmission must be reversible, capable that is of rotating in two directions. This makes it possible to employ for example a mechanical continuous transmission without losing the advantages described above. It must however be taken into consideration that in certain circumstances the speed of the prime mover or engine will change on the other side of the transmission when it shifts from the initial to the subsequent range. This drawback can be eliminated when necessary by positioning in a known manner an additional adaptor gear between the drive shaft and the intermediate gearing or prime mover.

BRIEF DESCRIPTION OF THE DRAWINGS

Some embodiments of the invention will now be described with reference to the drawings, in which.

The following parts are labeled with the same reference numbers in FIGS. 1-3.

DESCRIPTION OF THE PREFERRED EMBODIMENTS

Figure 1:
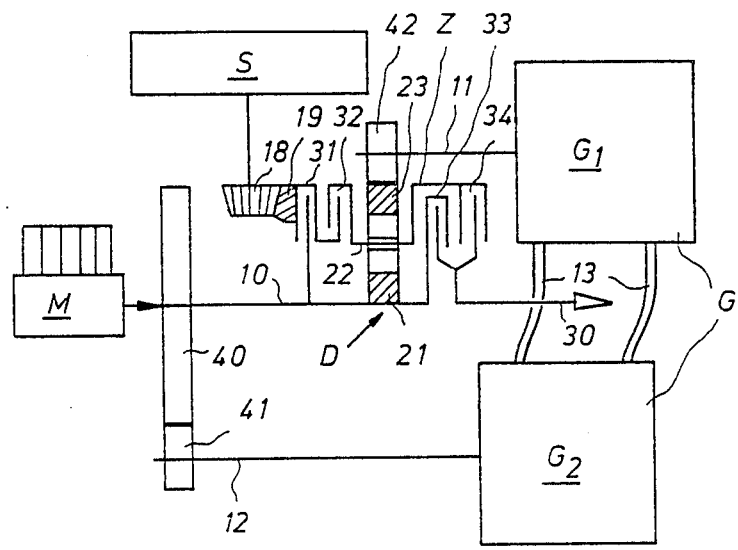
FIG. 1 is a strictly schematic representation of a drive assembly.

M—prime mover in the form of an internal-combustion engine with an engine shaft 10, S—flywheel, which has bevel-gear reduction drive consisting of a pinion 18 coupled to the flywheel and of a ring gear 19, G—continuously variable transmission, comprising two separate hydrostatic units $G_1$ and $G_2$ that can operate alternately as pump and engine, that are coupled with a shaft 11 or 12, and that are connected through hydraulic lines 13, D—differential with sun wheel 21, pinion cage 22, and internal geared wheel 23, Z—intermediate gearing in the form of a rotating drum coupled to pinion cage 22, 30—driven shaft, 31—clutch between engine shaft 10 and ring gear 19, associated with the reduction of flywheel S, 32—clutch between ring gear 19 (flywheel S) and intermediate gearing Z, 33—clutch between engine shaft 10 and drive shaft 30, and 34—clutch between intermediate gearing Z and driven shaft 30.

As is generally known, any clutch can be replaced if necessary with a component consisting of a planetary gear set and a brake for the ring gear.

The engine shaft 10 in FIG. 1 is connected to hydrostatic unit $G_2$ by a pair of gear wheels 40, 41. The sun wheel 21 of differential D also bears against engine shaft 10, while the outside of internal geared wheel 23 on the other hand engages a gear wheel 42 that bears against the shaft 11 of hydrostatic unit $G_1$. Between the sun wheel and the internal geared wheel is the pinion cage 22.

Figure 2:
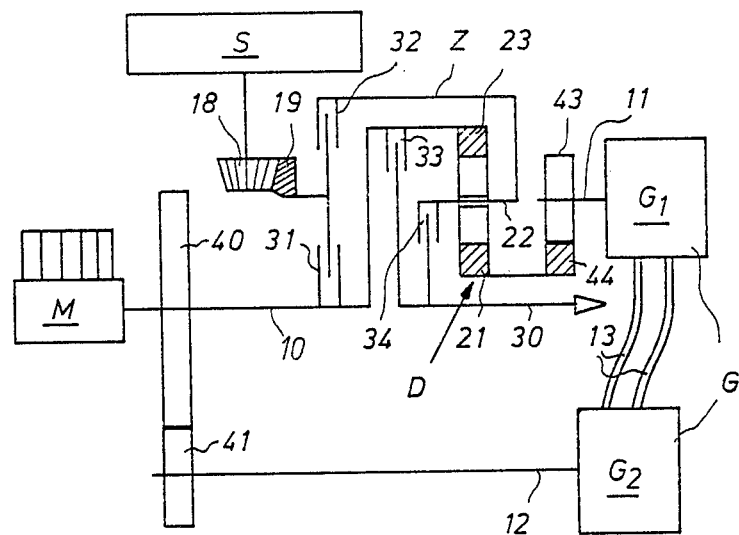
FIG. 2 is a schematic representation of a variation of the assembly shown in FIG. 1.

The engine shaft 10 in FIG. 2 is also connected to hydrostatic unit $G_2$ by a pair of gear wheels 40, 41, but also with internal geared wheel 23. Hydrostatic unit $G_1$ is connected by a pair of gear wheels 43, 44 to sun wheel 21.

Figure 3:
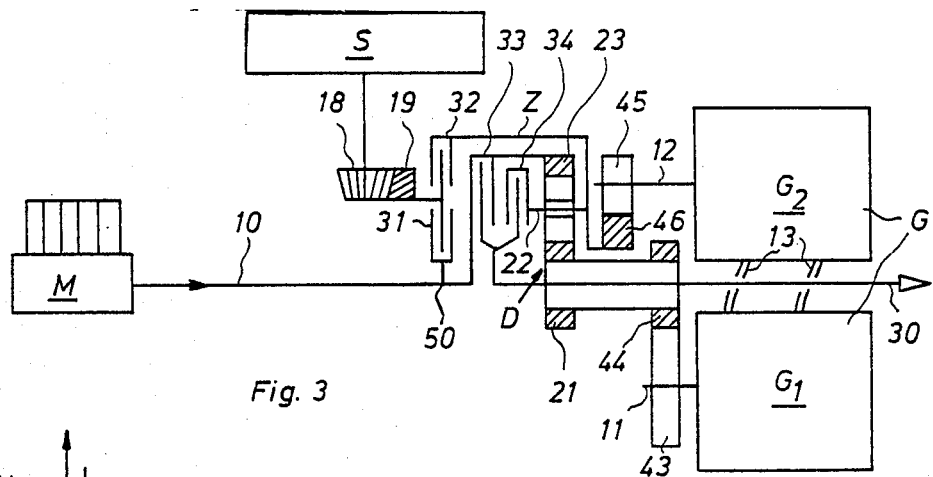
FIG. 3 is a variation of the assembly shown in FIG. 2.

The hydrostatic unit $G_1$ in FIG. 3 is also connected by a pair of gear wheels 43, 44 to sun wheel 21. Hydrostatic unit $G_2$, however, is connected by a pair of gear wheels 45, 46 to pinion cage 22 and hence also to intermediate gearing Z. Internal geared wheel 23 is again coupled to engine shaft 10.

Figure 5:
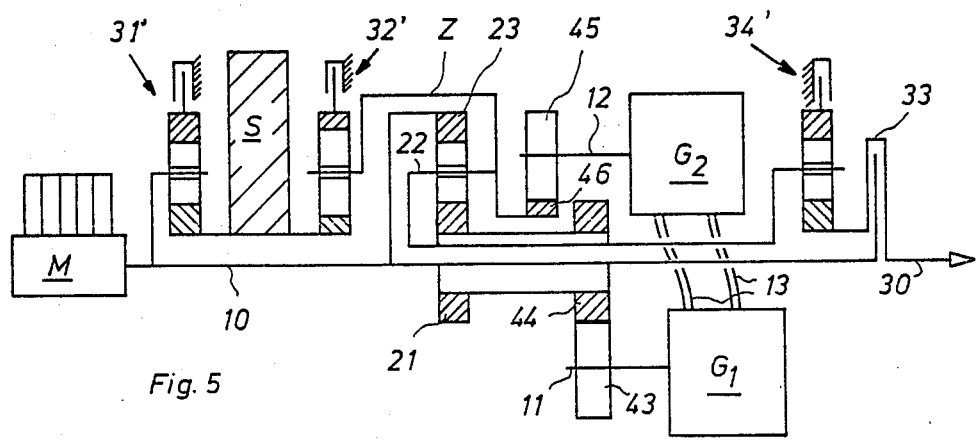
FIG. 5 shows another embodiment of the invention.

The transmission elements 19, 31, 32, 21, 22, 23, Z, 33, and 34 in FIG. 1 are shown in longitudinal section, and only the half above shaft 10 and 30 is shown, with the bottom half left out for greater clarity. The mode of representation in FIGS. 2, 3 and 5 is the same.

Figure 4:
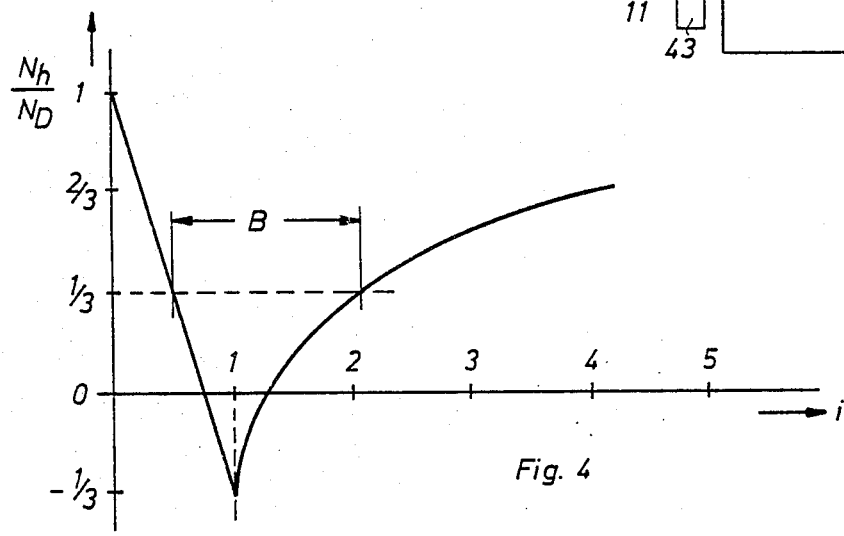
FIG. 4 is a graph of the characteristic curve of the assembly shown in FIG. 3.

The three embodiments shown in FIGS. 1, 2, and 3 function similarly and will now be explained with reference to FIGS. 3 and 4. FIG. 4 shows what is known as an output distribution $N_h/N_D$, the ratio of hydraulic power $N_h$ to the total power $N_D$ transmitted through differential D over the total transmission gear ratio i, which is the ratio $n_{30}/n_{19}$ of the speed of driven shaft 30 to that of ring gear 19.

In the initial-operation range, clutches 31 and 34 are engaged and clutches 32 and 33 open, adding the engine output to that of the flywheel at point 50 and transferring the total to internal geared wheel 23 of differential D. From this point on, the output is conveyed partly through components 22, 46, 45, 12, $G_2$, $G_1$, 43, 44, 21, 22, and 34 and partly from pinion cage 22 through clutch 34 directly to driven shaft 30. At start-up, the output distribution $N_h/N_D$ equals 1 and the ratio of the hydrostatic transmission 0. The output distribution decreases rapidly and linearly. At $N_n/N_D=0$ one of the hydrostatic units reverses, with the gear ratio equal to 1 in the hydrostatic transmission. From this point on, the output distribution continues to drop until gear ratio $i=1$. Now, the speed ratio of each of the clutches 32 and 33 equals 1, so that they can be engaged without the necessity of synchronization, simultaneously releasing clutches 31 and 34. This will transmit the engine output through clutch 33 directly to driven shaft 30. The flywheel output travels through clutch 32 to intermediate gearing Z, whence it is transferred partly through transmission components 46, 45, 12, G, 43, 44, D, and 33 and partly directly through differential D and clutch 33 to driven shaft 30, with output distribution $N_n/N_D$ increasing, as can be seen from FIG. 4, hyperbolically.

The value of $N_h/N_D$ for a particular changeover point can be determined by the ratio of sun wheel 21 to internal geared wheel 23. In the embodiments in FIGS. 1 and 2 the characteristics drop steeply and hyperbolically, in contrast to FIG. 4, in the initial range and rise linearly beginning at $i=1$.

Thus, the different linkages between differential D and the other transmission components will always keep the changeover point at negative values of $N_h/N_D$ that are greater than ½ in FIG. 1 and less than ½ in FIG. 2.

The segment B in FIG. 4 shows the range of low hydraulic power. This can be defined for example as the range in which the absolute value of $N_h/N_D$ is less than ⅓. As mentioned above, the wider the range B, the higher the mean efficiency of the drive assembly.

Other operating conditions as well can be obtained in all the embodiments shown in FIGS. 1 through 3. When only clutch 32 is engaged, the power from prime mover M can be transferred through gears D and G to flywheel S (or vice versa). The speed of flywheel S is preferably increased, however, from driven shaft 30 through gears G and D when the vehicle is braked. The clutches are, at the same time, activated as described above with reference to FIGS. 3 and 4. When only clutch 34 is engaged, the power from prime mover M can only flow through gears D and G to the drive shaft (mountain driving conditions). Finally, if only clutch 33 is engaged, the power will flow directly from prime mover M to driven shaft 30 (cross-country conditions).

The embodiment shown in FIG. 5 differs from those described above in that three of the clutches have been replaced with shifting units 31', 32', and 34', each consisting of a planetary gear with a brake for the internal geared wheel. The flywheel S' is fixed to a hollow shaft connected to the sun wheel in each of the two units 31' and 32'. The arrangement of differential D and the linkage of its components 21, 22, and 23 is the same as in FIG. 3, as is that of the hydrostatic units $G_1$ and $G_2$. The function of coupling 33 or shifting unit 34' is also unchanged. Only their position is different. The ratios of the planetary gears in shifting units 31', 32', and 34' can be selected so that neither of the hydrostatic units has to be reversible (in rotation) and so that shifting can therefore take place at synchronized speeds.

A simple clutch 34 could have been used instead of shifting unit 34' in the embodiment in FIG. 5. This might admittedly make for changes in engine speed when the device is shifted, but such problems can usually be handled easily.

PREFERRED USES

The drive assembly in accordance with the invention will be especially useful in motor vehicles, preferably in city buses, which have to be frequently braked, because the braking power can be stored in the flywheel for subsequent use.

I claim:

1. A drive assembly for motor vehicles, comprising:
   an engine, a flywheel supported for rotation; an engageable first clutch between the engine and the flywheel;
   intermediate gear means; an engageable second clutch between the flywheel and the intermediate gear means;
   a driven shaft for being driven to rotate by the engine; a third engageable clutch between the engine and the driven shaft;
   a fourth engageable clutch between the intermediate gear means and the driven shaft;
   a continuously variable transmission having separate first and second elements;
   a differential associated with the transmission, said differential being limited to three transmission components, with a first component connected to the engine, a second component connected to the first connection element of the continuously variable transmission and a third component connected with the intermediate gear means.

2. The drive assembly of claim 1, wherein the second connection element of the continuously variable transmission is connected to the engine.

3. The drive assembly of claim 2, wherein the differential is a planetary gear set, wherein the first component is a sun wheel, the second component is an internal geared wheel around the sun wheel, and the third component is a pinion cage connected and positioned between the sun wheel and the internal geared wheel.

4. The drive assembly of claim 1, wherein the second connection element of the continuously variable transmission is connected to the intermediate gear means.

5. The drive assembly of either of claims 2 or 4, wherein the differential is a planetary gear set, wherein the first component is an internal geared wheel, the second component is a sun wheel inside the internal geared wheel and the third component is a pinion cage connected and positioned between the sun wheel and the internal geared wheel.

6. The drive assembly of claim 5, wherein the second element of the continuously variable transmission is connected to the third component.

7. The drive assembly of any of claims 1, 2 or 4, wherein there is a gear ratio between the flywheel and the engine, on the one hand and a gear ratio between the flywheel and the intermediate gear means, on the other hand, and these gear ratios are selected so that the first connection element of the continuously variable transmission will rotate in the same sense under all operating conditions.

8. A drive assembly for motor vehicles, comprising:
   an engine, a flywheel supported for rotation; an engageable first clutch between the engine and the flywheel;
   intermediate gear means; an engageable second clutch between the flywheel and the intermediate gear means;
   a driven shaft for being driven to rotate by the engine; a third engageable clutch between the engine and the driven shaft;
   a fourth engageable clutch between the intermediate gear and the driven shaft;
   a continuously variable transmission having separate first and second elements;
   a first transmission component connected to the engine, a secod transmission component connected to the first connection element of the continuously variable transmission and a third transmission component connected with the intermediate gear means.

* * * * *